March 1, 1966 G. J. MANDERS 3,237,280

METHOD OF MANUFACTURING MAGNETIC HEADS

Filed Sept. 6, 1960

INVENTOR
Godefridus J. Manders

BY
Frank R. Trifari
AGENT

United States Patent Office 3,237,280

Patented Mar. 1, 1966

3,237,280

METHOD OF MANUFACTURING MAGNETIC HEADS

Godefridus Johannes Manders, Eindhoven, Netherlands, assignor to North American Philips Company, Inc., New York, N.Y., a corporation of Delaware Filed Sept. 6, 1960, Ser. No. 54,278
Claims priority, application Netherlands, Sept. 5, 1959, 243,049
7 Claims. (Cl. 29—155.5)

The invention relates to a method of manufacturing a magnetic head having two or more parallel gaps lying one after the other and to magnetic heads manufactured by this method.

Magnetic heads having two parallel gaps lying one after the other may be employed for many purposes. One gap may, for example, be used as a recording gap and the other as a scanning gap; thus the recording and reproducing head is combined in a single magnetic head, which may be of advantage in recording pulses, when the recorded signal is to be checked immediately.

Such a combination is also required when the head is to be used in conjunction with a magnetic record carrier moved at a very low rate (for example 9 cms. per second) and it is a further requirement to record a considerable frequency band (for example up to 15 kc./s.). With these requirements it is not possible to use compromise values for the relatively opposite requirements with respect to the gap lengths for the recording and scanning gaps. It appears that a satisfactory recording of the magnetic carrier throughout the depth of the magnetic layer requires, regardless of the speed of the magnetic carrier, an optimum gap length of about 30$\mu$. For reproduction, however, the optimum value of the gap length depends not only upon the desired frequency spectrum but also, to a great extent, upon the speed of the magnetic carrier thus it must be sufficiently smaller, for example, by a factor 2, than the shortest recorded wavelength. In a given case the length of the scanning gap may amount to 2/$\mu$.

The directions of these gaps with respect to the magnetic carrier must, of course, be the same. Only a small tolerance (a difference in direction of 3′ with a track width of 3 mms. and a velocity of the magnetic carrier of 9.5 cms./sec.) is admissible.

Such a high accuracy in the relative positions of the two gaps can, in practice, be realized only when the two heads, i.e. the recording and the reproducing head, are mechanically rigidly secured to each other; even when they are thus secured, however, an adequately accurate relatively parallel position of the two gaps cannot be ensured without further means.

The invention provides a simple, efficient means to attain the above-stated desirable accuracy.

In accordance with the method of the invention, the magnetic core halves, of which the pole shoes form pairwise the boundaries of the gaps, the relatively opposite halves of each pair of adjacent, individual magnetic circuits, together with the material provided between these halves are connected to form a fixed unit (inner unit) constituting a rigid mechanical assembly, after which the two head surfaces of this unit, on which the other core halves provided with windings are to bear, are ground to be planoparallel.

The head described above, having one recording gap and one reproducing gap, may also be employed for the reproduction of a sound with reverberation by means of the feed-back of the circuit including the reproducing gap to the circuit of the recording gap. In special cases it may be desired, however, to provide a delay for each individual loudspeaker provided in the reproducing space and connected to the reproducing circuits. This may be achieved by means of a magnetic head having at least two reproducing gaps. In principle, use could be made to this end of a magnetic head with two gaps, provided it is used in conjunction with a magnetic record carrier moved at a conventional rate, at least at a rate of more than 10 cms./sec. However, if the advantage of a magnetic head having a separate recording gap and separate reproducing gaps for use in conjunction with a magnetic record carrier moved with very low speeds is to be obtained, this head is to be provided with three or more gaps.

In order to obtain an accurately parallel orientation of these gaps, each of the other core halves provided with the windings is connected, by the method according to the invention in the manner in which the inner unit described above is manufactured, with a core half of a further individual circuit to obtain a mechanical unit (intermediate unit). Such a head is capable of producing echo effects in a conventional manner when either the number of reproducing gaps is chosen high or when, in the case of a smaller number of reproducing gaps, a circuit of one of them is fed back to that of the recording gap. At any rate, when using such a multigap magnetic head, it is ensured that in a large reproducing space each of the various loudspeakers can have its individual delay and, moreover, that the reproduced sound may have echo effects.

According to a further aspect of the method according to the invention foils of the thickness of the desired gap length are clamped in at the area of the gaps, when the other intermediate units or end core halves are applied to the end surfaces of the inner units and intermediate units respectively; thus two or more most accurately parallel gaps of precisely the desired length are obtained.

The invention will now be described more fully with reference to the drawing.

Figure 1:
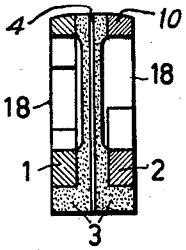
FIG. 1 is a sectional view of the two inner core halves and the intermediate connecting and screening material.
Figure 2:
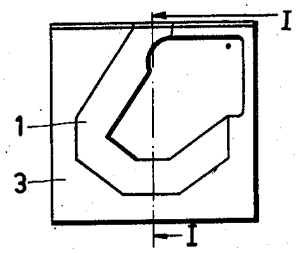
FIG. 2 is an elevation of the left-hand sidewall of the unit shown in the sectional view of FIG. 1.

The workpiece shown in FIGS. 1 and 2 consists of the two inner core halves 1 and 2, the shape of which is illustrated in FIG. 2 and which are combined by an intermediate layer 3 of a plastic or similar bonding material to form a fixed unit. Between the core halves 1 and 2 a magnetic screening 4 may be provided in the layer 3.

Figure 4:
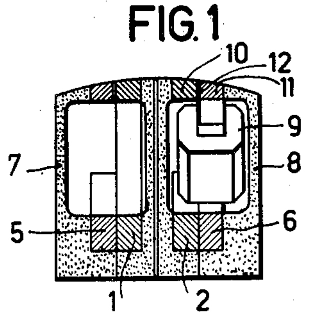
FIG. 4 is a sectional view of a complete reproducing head.
Figure 3:
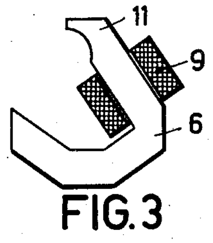
FIG. 3 is an elevation of one of the outer core halves and the winding slipped onto it.

The head surfaces 18 of this workpiece formed by the parts 1 to 4 are ground (lapped) to be accurately planoparallel. Then the two other core halves 5 and 6, of which one is shown in FIG. 3, are ground to accurate flatness on the free sides. The windings 9, of which only one is shown in FIG. 4, are then slipped onto these core halves 5 and 6, after which the latter are urged against the two planoparallel head surfaces on the inner core halves, in which position they are secured with the aid of a cast resin 7 and 8. Between the engaging poleshoes 10 and 11 of the core halves is arranged a foil 12 having a thickness of the gap length desired locally, for example, 30$\mu$ with the recording gap and $3\mu$ with the reproducing gap; this foil is held clamped tight between the poleshoes.

The most favorable length for the two gaps and an accurately parallel orientation of the two gaps are thus ensured in a simple manner.

Figure 5:
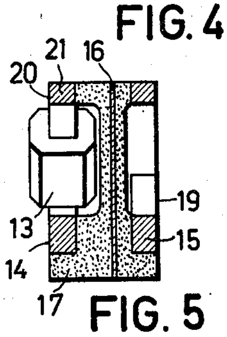
FIG. 5 is a sectional view of an intermediate unit according to the invention.
Figure 6:
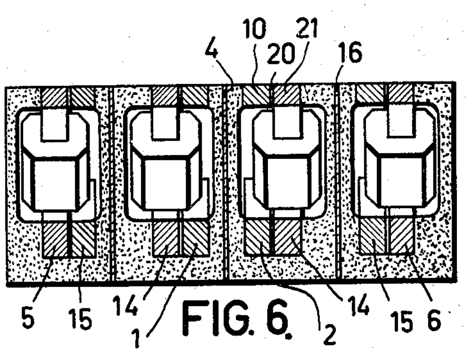
FIG. 6 is a sectional view of a complete magnetic head comprising an inner unit, an intermediate unit on the left and right-hand sides thereof, and an end core half on the extreme left-hand side and on the extreme right-hand side thereof.

The intermediate unit shown in FIG. 5 consists of a core half 14, provided with windings 13, as is shown in FIG. 3, and a core half 15 of a further individual magnetic circuit, between which is arranged a magnetic screening 16, as in the workpiece shown in FIG. 1, after which the assembly is secured with the aid of cast resin 17. The head surfaces 19 of this unit are then ground to flatness, and subsequently the inner unit and the intermediate unit, with the interposition of a foil 20 between the engaging poleshoes 10 and 21 of the core halves 2 and 14 respectively, are secured to each other. The magnetic head shown in the completed state in FIG. 6 comprises an inner unit as shown in FIG. 1 and on the right-hand side thereof an intermediate unit as shown in FIG. 5 and on the left-hand side thereof a similar intermediate unit, while on the extreme left-hand side and on the extreme right-hand side the end core halves as shown in FIG. 4 are arranged. If with this head having four gaps a special, larger recording gap length can be provided, this is to be provided, as a matter of course, at the place of the first gap.

The invention may also be used with a recording and reproducing head for a double sound track, for example, for stereophony. It is required in this case that the four gaps, i.e. two for the upper track and two for the lower track, should lie pairwise in accurately parallel planes.

First the four inner core halves with their screening means and fastening means are composed, the outer surfaces of this assembly are ground to be accurately plano-parallel and the outer core halves are pairwise arranged thereon in the manner as described above for the single head.

Figure 7:
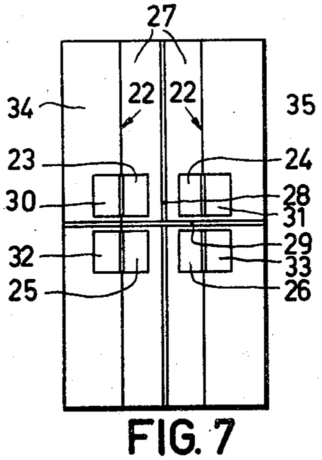
FIGS. 7 and 8 show a double recording and reproducing head for stereophony.
Figure 8:
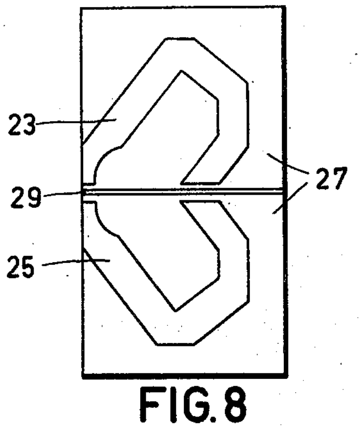

This is illustrated in FIGS. 7 and 8. The workpiece to be ground to a planoparallel shape consists of the four inner core halves 23, 24, 25 and 26, the connecting material 27 and the screening members 28 and 29. After the head surfaces 22 of this workpiece have been ground off, the four outer core halves 30, 31, 32 and 33 are pairwise embedded in fastening pieces 34 and 35 respectively, and urged against the associated inner core halves, after having been ground to flatness; foils of the thickness of the desired gap length may be used at the place of the poleshoes. Thus all requirements are fulfilled; the recording gaps are in line with each other and extend precisely parallel to the reproducing gaps, which are also aligned, and each gap has the length desired.

While the invention has been described with respect to specific embodiments, various modifications thereof will be apparent to those skilled in the art without departing from the inventive concept, the scope of which is set forth in the appended claims.

What is claimed is:

1. A method of manufacturing a magnetic head having at least two parallel non-colinear gaps each lying between the poleshoes of a magnetic circuit consisting of two adjacent core halves, comprising: forming a mechanically rigid assembly of two core halves belonging to different magnetic circuits, said assembly having exposed non-colinear poleshoe faces, grinding said poleshoe faces until they are substantially plano-parallel, placing the poleshoe faces of corresponding core halves against the two ground poleshoe faces of the assembly, and mechanically securing said corresponding core halves in position.

2. A method of manufacturing a magnetic head having at least two parallel non-colinear gaps each lying between the poleshoes of a magnetic circuit consisting of two adjacent core halves, comprising: forming a mechanically rigid assembly of two inner core halves belonging to different magnetic circuits, said assembly having exposed non-colinear poleshoe faces, grinding said poleshoe faces until they are substantially plano-parallel, placing the poleshoe faces of corresponding outer core halves having electrical windings coupled thereto against the two ground poleshoe faces of the assembly, and securing said corresponding outer core halves in position.

3. A method of manufacturing a magnetic head having at least two parallel non-colinear gaps each lying between the poleshoes of a magnetic circuit consisting of two adjacent core halves, comprising: forming a mechanically rigid assembly of two core halves belonging to different magnetic circuits, said assembly having exposed non-colinear poleshoe faces, grinding said poleshoe faces until they are substantially plano-parallel, placing a non-magnetic spacer against each poleshoe face, placing the poleshoe faces of corresponding core halves against the two ground poleshoe faces and non-magnetic spacers of the assembly, and mechanically securing said corresponding core halves in position.

4. A method of manufacturing a magnetic head having at least two parallel non-colinear gaps each lying between the poleshoes of a magnetic circuit consisting of two adjacent core halves, comprising: forming a mechanically rigid assembly of two inner core halves belonging to different magnetic circuits, said assembly having exposed non-colinear poleshoe faces, grinding said poleshoe faces until they are substantially plano-parallel, placing a non-magnetic spacer against each poleshoe face, placing the poleshoe faces of corresponding outer core halves having electrical windings coupled thereto against the two ground poleshoe faces of the assembly, and securing said corresponding outer core halves in position.

5. A method of manufacturing a magnetic head having at least three parallel non-colinear gaps each lying between the poleshoes of a magnetic circuit consisting of two adjacent core halves, comprising: forming a first mechanically rigid assembly of two core halves belonging to different magnetic circuits, said assembly having exposed non-colinear poleshoe faces, grinding said poleshoe faces until they are plano-parallel, forming second and third mechanically rigid assemblies of two core halves with exposed poleshoe faces belonging to different magnetic circuits, one of the core halves of each of said second and third assemblies having electrical windings coupled thereto, grinding the exposed poleshoe faces of the second and third assemblies until they are substantially plano-parallel, placing the corresponding ground faces of the core halves of the second and third assemblies respectively having electrical windings coupled thereto against the two ground faces of the first assembly, and mechanically securing said assemblies in position.

6. A method of manufacturing a magnetic head having at least three parallel non-colinear gaps each lying between the poleshoes of a magnetic circuit consisting of two adjacent core halves, comprising: forming a first mechanically rigid assembly of two core halves belonging to different magnetic circuits, said assembly having exposed non-colinear poleshoe faces, grinding said poleshoe faces until they are substantially plano-parallel, forming second and third mechanically rigid assemblies of two core halves with exposed poleshoe faces belonging to different magnetic circuits, one of the core halves of each of said second and third assemblies having electrical windings coupled thereto, grinding the exposed poleshoe faces of the second and third assemblies until they are substantially plano-parallel, placing a non-magnetic spacer against each poleshoe face of the first assembly, placing the corresponding ground faces of the core halves of the second and third assemblies respectively having electrical windings coupled thereto against the two ground faces and non-magnetic spacers of the first assembly, and mechanically securing said assemblies in position.

7. A method of manufacturing a magnetic head having at least three parallel non-colinear gaps each lying between the poleshoes of a magnetic circuit consisting of two adjacent core halves, comprising: forming a first mechanically rigid assembly of two core halves belonging to different magnetic circuits, said assembly having exposed non-colinear poleshoe faces, grinding said poleshoe faces until they are substantially plano-parallel, forming second and third mechanically rigid assemblies of two core halves with exposed poleshoe faces belonging to different magnetic circuits, one of the core halves of each of said second and third assemblies having electrical windings coupled thereto, grinding the exposed poleshoe faces of the second and third assemblies until they are substantially plano-parallel, placing a non-magnetic spacer against each poleshoe face of the first assembly, placing the corresponding ground poleshoe faces of the core halves of the second and third assemblies respectively having electrical windings coupled thereto against the two ground faces and non-magnetic spacers of the first assembly, completing the magnetic circuits of the other core halves of the second and third assemblies by placing a plurality of other core half assemblies in contiguous relation to said second and third assemblies, and mechanically fixing securing said assemblies in position.

References Cited by the Examiner

UNITED STATES PATENTS

| | | | |
|---|---|---|---|
| 2,915,812 | 12/1959 | Rettinger ---------- | 29—155.59 |
| 2,967,750 | 1/1961 | Koren ------------ | 179—100.2 |

FOREIGN PATENTS

| | | |
|---|---|---|
| 884,881 | 5/1953 | France. |
| 1,213,217 | 10/1959 | France. |
| 800,233 | 8/1958 | Great Britain. |

WHITMORE A. WILTZ, *Primary Examiner.*

NEWTON N. LOVEWELL, JOHN F. CAMPBELL, *Examiners.*